United States Patent [19]
Casarini et al.

[11] Patent Number: 5,358,989
[45] Date of Patent: * Oct. 25, 1994

[54] COMPOSITIONS OF POLYPHENYLENE OXIDE OR MIXTURES OF POLYPHENYLENE OXIDE WITH β-DIKETONES

[75] Inventors: Andrea Casarini; Giorgio della Fortuna; Aurelio De Chirico, all of Milan, Italy

[73] Assignee: Enichem S.p.A., Milan, Italy

[*] Notice: The portion of the term of this patent subsequent to Mar. 16, 2010 has been disclaimed.

[21] Appl. No.: 30,877

[22] Filed: Mar. 12, 1993

Related U.S. Application Data

[63] Continuation of Ser. No. 774,514, Oct. 8, 1991, Pat. No. 5,194,476.

[30] Foreign Application Priority Data

Oct. 10, 1990 [IT] Italy .................................. 21699 A/90

[51] Int. Cl.$^5$ ........................... C08K 5/20; C08K 5/10
[52] U.S. Cl. ..................................... 524/360; 524/357
[58] Field of Search ............... 524/360, 218, 219, 227, 524/310, 314, 354, 355, 357, 358

[56] References Cited

U.S. PATENT DOCUMENTS
4,929,675 5/1990 Abe et al. .

FOREIGN PATENT DOCUMENTS
767138 9/1980 U.S.S.R. .

*Primary Examiner*—Veronica P. Hoke
*Attorney, Agent, or Firm*—Oblon, Spivak, McClelland, Maier & Neustadt

[57] ABSTRACT

Polymeric compositions characterized by their excellent thermal stability containing a polyphenylene ether or one of its blends with at least one (co)polymer of styrene and at least one compound belonging to the group of linear and/or cyclic beta diketones.

Beta-diketones are capable of giving polyphenylene ether and/or its blends with styrenic polymers a long-lasting thermal stability in the molten state and of guaranteeing sufficient fluidity to ensure better processability compared to the same polymers in the known art.

20 Claims, No Drawings

COMPOSITIONS OF POLYPHENYLENE OXIDE OR MIXTURES OF POLYPHENYLENE OXIDE WITH β-DIKETONES

This is a continuation of application Ser. No. 07/774,514, filed on Oct. 8, 1991 now U.S. Pat. No. 5,194,476.

The present invention concerns polymeric compositions, characterized by their excellent fluidity in the molten state and thermal stability, obtained by mixing at least one compound belonging to at least one of the following structural formulae:

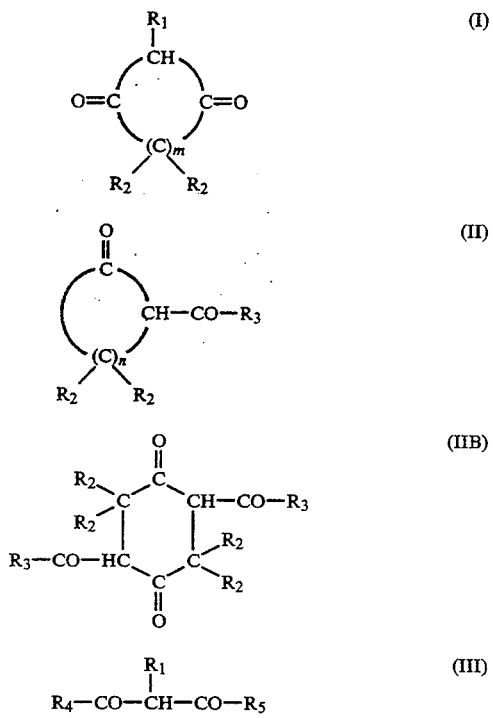

where m, n, $R_1$, $R_2$, $R_3$, $R_4$ and $R_5$ have the meaning specified later, with at least one polyphenylene ether (PPE) (otherwise known as polyphenylene oxide) or with blends or polymeric alloys of at least one polyphenylene oxide with at least one (co)polymer of styrene.

It is known that polyphenylene ethers (PPE), obtained from the (co)polymerization by oxidative coupling of one or more substituted phenols, cannot easily be used on their own because of their high viscosity in the molten state, the consequently high working temperatures and high degree of thermo-oxidative sensitivity causing colour changes (darkening), partial cross-linking and gelation of the polymer during the working process.

The combination of PPE with one or more styrenic resins considerably reduces the operating temperature and produces resins which can be processed more easily and with a mutual improvement in the intrinsic properties of the constituents. By varying the ratios between the polyphenylene oxide and the styrenic polymer and depending on the application requirements, shock resistant polyphenylene oxide can be obtained with improved processability, or polystyrenes and their copolymers with improved heat and flame resistance, better impact strength and technological properties.

It is also known however that not only PPE, but also its blends with styrenic homo and copolymers, in spite of the above improvements, undergo a change in the molecular structure at the high transformation temperatures of the manufactures.

With particular reference to polyphenylene oxide, thermal degradation occurs, with a consequent decrease in the molecular dimensions, and/or a combination of macromolecules can occur, caused by radical processes due to oxygen in the air and triggered by the presence of catalytic residues. These combinations in the case of PPE obtained by the oxidative coupling of 2,6-dimethylphenol, are created by the methylic groups present in the polymeric chain as substituents of the benzenic ring in positions 2 and 6.

The overall effect of this change is a general decrease, even if limited, of the number average molecular weight of the polyphenyleneoxide and in some cases an increase in the weight average molecular weight, with a consequent variation in the molecular weight distribution. When the cross-linking action is particularly vigorous, various quantities of gel can be formed.

It is known to experts in the field that the effects of heat degradation can be considerably reduced with the help of suitable stabilizers belonging to different classes of compounds having varying degrees of effectiveness, such as: alkyl and/or aryl phosphites, phenols whose characteristic function is protected by substituent groups having notable sterical hindrance, thioethers of esters of aliphatic carboxylic acids, dithiocarbamates of heavy metals, 2-mercapto benzimidazole, 2-mercaptobenzotriazole, 2,4-bis(n-octylthio)-6-(4-hydroxy-di-ter-butyl-aniline)-1,3,5 triazine, hexamethylphosphoramide, etc.

Contrariwise, the cross-linking reactions triggered by radical processes cannot be governed by the above additives and generally require the use of chemical compounds having peculiar structures.

These compounds, probably nullify the radical systems present in a latent state in the polyphenylene oxide, their effects becoming manifest when the material is heated to high transformation temperatures.

Transformation technology requires the polymeric material to have sufficient thermal stability so as to ensure only slight variations in the molecular weight, guaranteeing an almost constant fluidity; this condition is necessary to obtain manufactures with satisfactory technological properties at a high hourly output.

Patent literature indicates several compounds which are effective additives for thermally stabilizing polyphenylene oxide and/or its blends with polystyrenic polymers, in the sense of preserving the fluidity of the material in its molten state at an adequate level.

These products, for example, are aliphatic and cycloaliphatic conjugated dienic compounds, dienophilic ethylenic compounds and their precursors.

European Patent Application No. 121974 cites cyclopentadiene, N-alkyl or aryl substituted maleimide, acenaphthylene, indene, maleic anhydride, mixtures of maleic anhydride with primary amines.

The use of maleic acid imides is claimed in European Patent Application No. 222246, whereas European Patent Application No. 257486 describes the use of alkyl esters and/or alkylaryl esters of maleic and fumaric acids as heat stabilizing agents. All the substances used in the known art contain either heteroatoms or unsaturations in the molecule, which are capable of causing an increase in the yellow index of the polymeric compositions containing them, and in some cases bad-smelling products can be obtained. This is the case of some stabilizers containing sulphur.

French Patent No. 2.297.227 describes the use of beta-diketones and beta-ketoaldehydes as co-stabilizers of polyvinylchloride associated to the carboxylic acid soaps of some bivalent metals such as zinc or barium.

The presence of these soaps is considered indispensable and the betadiketones and betaketoaldehydes are regarded as secondary stabilizers.

Their effectiveness is closely linked to the presence of labile chlorine atoms in an allylic position, in the polyvinylchloride molecule.

These additives, by substituting the allylic chlorine, graft themselves to the polyvinylchloride molecule, thus preventing or reducing further dehydrochlorination and the formation of polyene sequences which are also responsible for dark coloring.

The present invention is based on the extremely surprising experimental discovery that some chemical compounds, belonging to the betadiketone groups, are able to give polyphenylene oxide and its blends with styrenic polymers a long-lasting thermal stability of the materials in their molten state, and also guarantee sufficient fluidity to allow improved processability.

The effectiveness of betadiketones as stabilizers of polyphenylene oxide and its blends, resulting from experimental observations, is consequently totally unexpected, in that the polyphenylene oxide molecule does not normally contain atoms of chlorine or other halogens and, owing to the efficiency of these stabilizers, the presence of soaps is in no way required. In addition, also cyclic betadiketones have proved to be extremely suitable for the purposes of the present invention.

The stabilizing additives, subject of the present invention, capable of giving polyphenylene oxide and its blends with homo and copolymers of styrene an improved thermal stability are represented by the structures:

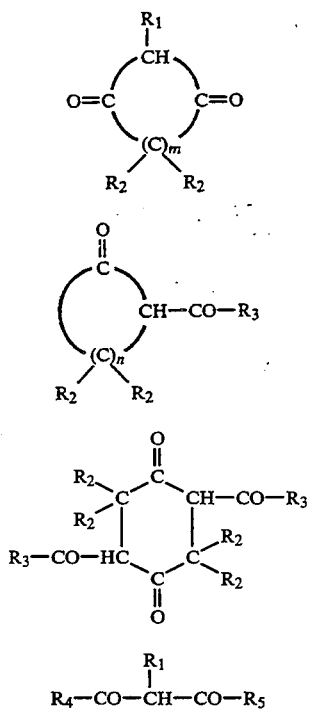

where, m is an integer ranging from 2 to 5, and n is an integer ranging from 3 to 6, $R_1$ and $R_2$, independently either the same or different, represent a hydrogen atom, an alkyl, cycloalkyl, arylalkyl, aryl, haloalkyl, radical, a chlorine atom, a bromine atom, a $—(CH_2)_x—COOR_6$ radical with x being an integer ranging from 1 to 5, where $R_6$ can be chosen from hydrogen, alkyl, cycloalkyl, arylalkyl, aryl, alkylaryl, haloalkyl, haloaryl, haloalkylaryl; $R_3$, $R_4$ and $R_5$, either the same or different, can be independently chosen from: hydrogen, alkyl, cycloalkyl, arylalkyl, haloalkyl, aryl, alkylaryl, haloaryl, haloalkylaryl, $OR_7$, $N(R_7)_2$, $CH_2R_7$, $CH_2—COR_7$, $CH_2—COOR_7$ where $R_7$ can be independently chosen from hydrogen, alkyl, cycloalkyl, arylalkyl, haloalkyl, aryl, alkylaryl, haloaryl, haloalkylaryl.

Preferred stabilizing additives, for the purpose of the present invention, are the compounds of formulae (I), (II), (II B) and (III) wherein $R_1$ is hydrogen and $R_3$ is an $OR_7$ or $N(R_7)_2$ radical where each $R_7$ can independently have the above specified meaning.

Examples of chemical compounds suitable for the present invention and having a structure corresponding to (I) are cyclopentane-1,3-dione, 2-methyl-cyclopentane-1,3-dione, cyclohexane-1,3-dione, 2-methyl-cyclohexane-1,3-dione-5,5-dimethyl-cyclohexane-1,3-dione.

Compounds having a chemical structure corresponding to (II) are for example: 2-methoxycarbonylcyclopentanone, 2-ethoxycarbonylcyclopentanone, 2-ethoxycarbonyl cyclohexanone, etc.

Examples of chemical compounds suitable for the present invention and having a structure corresponding to (IIB) are:
diethyl-cyclohexane-1,4-dione-2,5-dicarboxylate;
dimethyl-cyclohexane-1,4-dione-2,5-dicarboxylate.

Examples of additives suitable for the present invention, with structure (III) are:
1-phenyl-1,3-butanedione, 1,3-diphenyl-2,4-pentanedione, 1,3-diphenyl-1,3-propanedione (Rhodiastab 83 of Rhone-Poulenc), 1,4-diphenyl-1,3-butanedione, 1-phenyl-5-methyl-1,3-hexanedione (Rhodiastab 82 of Rhone Poulenc), stearoylbenzoylmethane (Rhodiastab 50 of Rhone Poulenc), 1,5-diphenyl-1,3,5-pentanetrione, ethyl acetoacetate, ethyl benzoylacetate, ethyl 2-benzylacetoacetate, acetoacetanilide, diethyl-1,3-acetone dicarboxylate, ethyl phenylmalonate, ethyl ethylmalonate, ethyl malonate, terbutyl malonate, ethyl 2-acetylglutarate, ethyl acetylsuccinate, methyl acetylsuccinate.

These stabilizing agents are effective at a concentration of 0.05÷10 parts by weight for every 100 parts by weight of polyphenylene oxide or its blends with homo and copolymers of styrene. The best results are obtained with quantities of additive ranging from 0.1 to 4 parts by weight for every 100 parts by weight of polyphenylene oxide or its blends.

These stabilizing agents can be added to the polyphenylene oxide or its relative blends with homo and copolymers of styrene, using any of the known techniques for this purpose.

In any case, the addition of the stabilizing system of the present invention causes a decrease in the entity of the reactions which produce an increase in the molecular dimensions of the polyphenylene oxide, thus obtaining a considerable improvement in the fluidity under the same operating and transformation conditions of the polyphenylene oxide and its blends.

Polyphenylene ethers (PPE) are compounds which have been known for a long time. They are described in numerous patents, and are generally obtained by means of oxidative coupling in the presence of a suitable catalyst of one or more alkylphenols, the most widely used being 2,6-dimethylphenol.

They correspond to the general formula:

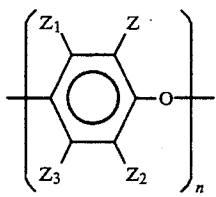 IV where Z, $Z_1$, $Z_2$, $Z_3$, are independently chosen from the group containing hydrogen, chlorine, bromine, fluorine, alkyl, substituted alkyl, cycloalkyl, substituted cycloalkyl, phenyl, substituted phenyl, and n represents the total number of monomeric units and is an integer higher than 50.

Equally suitable for the purposes of the present invention are polyphenylene ethers corresponding to the general formulae:

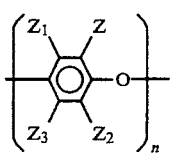 IV

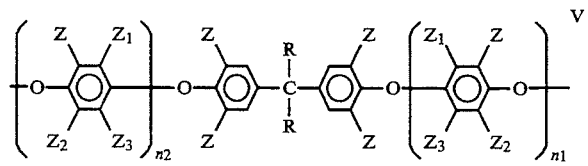 V

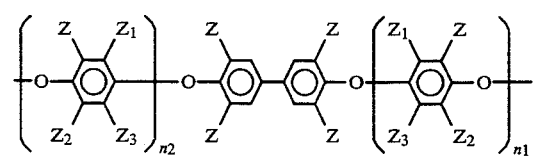 VI where Z, $Z_1$, $Z_2$, $Z_3$, have the same meanings as in the previous formula (IV), $n_1$ and $n_2$ are integers whose sum is higher than 50 and R is a hydrogen or an alkyl radical.

Non-restricting examples of PPE which can be used for the production of the polymeric compositions of the present invention and relative manufactures are:

poly(2,6-dimethyl-1,4-phenylene ether);
poly(2,6-diethyl-1,4-phenylene ether);
poly(2-methyl-6-ethyl-1,4-phenylene ether);
poly(2-methyl-6-propyl-1,4-phenylene ether);
poly(2,6-dipropyl-1,4-phenylene ether);
poly(2,3,6-trimethyl-1,4-phenylene ether);
poly(2-chloro-1,4-phenylene ether);
poly(2-bromo-1,4-phenylene ether);
poly(2-phenyl-1,4-phenylene ether);
poly(2-chloro-6-bromo-1,4-phenylene ether);
poly(2,6-dichloro-1,4-phenylene ether).

It is particularly preferable to use poly(2,6-dimethyl-1,4-phenylene ether) for which in structure (II) $Z_1=Z_3=H$, $Z=Z_2=CH_3$.

The poly(2,6-dimethyl-1,4-phenylene ether) most suitable for the purposes of the present invention has a weight average molecular weight $\overline{MW}$ of between 8,000 and 80,000 g/moles and more precisely in the range of 15,000÷60,000 g/moles, and an intrinsic viscosity, measured in chloroform at 25° C. of between 0.3 and 0.7 dl/g.

Equally suited for the purposes of the present invention are PPEs obtained by the oxidative coupling of 2 or more different phenols. Preferably, in these copolymers one of the two or more monomeric components is 2,6-dimethylphenol and the comonomer in 2,3,6-trimethylphenol.

As is widely known, the oxidative condensation of 2,6 xylenol is catalyzed by complexes of cupric salts with aliphatic amines; the present invention does not depend on the catalytic system used.

The methods of synthesis of the polyphenylene ethers used in the present invention are well known to experts in the field. For example the PPEs corresponding to formulae (V) and (VI) are described in "Die Makromolekulare Chemie" Vol. 186, (1985) pages 1835–1853.

The (co)polymers of styrene (or styrene resins) used for the purposes of the present invention, are all polymers, copolymers, interpolymers, random or block, linear or branched or graft, containing styrenic units.

Examples of these resins are polystyrene (PS), high impact polystyrene (HIPS), polystyrene grafted on any polymeric, plastic or thermoplastic substrate, ABS resins, SBR rubbers, linear or star copolymers based on polystyrene or grafted with polystyrene, various copolymers or interpolymers of styrene with different monomers, among which the copolymer styrene-maleic anhydride (sty-maleic) and styrene-maleic imide, styrene-acrylic acids, styrene-methacrylates, acrylonitrile-styrene-acrylates, methacrylate-acrylonitrile-butadiene-styrene etc.

The preparation of the above styrenic resins is also well known to experts in the field.

The polymeric compositions according to the present invention, contain from 1 to 99, preferably from 20 to 80 parts by weight of polyphenylene oxide, for every 100 parts by weight of the composition itself and from 0.95 to 99% by weight of styrenic resins. It is in fact possible, depending on the required uses of the polymeric blend, to obtain compositions with high mechanical properties (using low percentages of polystyrene), thus obtaining a modified polyphenylene oxide, or to prepare compositions which are rich in polystyrene having better processability but lower mechanical properties.

Compositions according to the present invention, containing from 0.95 to 80% by weight of styrenic resin are preferred.

Polymeric blends having an overall mixture of favourable characteristics such as high mechanical properties, good processability, thermal stability and reasonable flame-resistant performance, contain approximately equal parts by weight of polyphenylene oxide and styrenic resin. This is advantageous also from the economical point of view.

The excellent balance of properties of the polymeric compositions at issue makes it possible for them to be used in a wide range of areas including applications in the medical and biological fields (sterilization), components for electrical and electronic equipment (electrical properties), and cars (limited water absorption and shock-resistant properties) and in the general replacement of metallic parts (low water absorption, dimensional stability etc).

The compositions, subject of the present invention, may contain all or only some of the auxiliary agents used in the known procedure, such as: plasticizers, primary and secondary antioxidants, detaching agents, sliding agents, flame-retardant agents, antistatic agents, dyes, pigments, mineral charges, reinforcing agents such as glass fibres, microspheres, etc.

The polyphenylene oxide used in the following examples is obtained by the oxidative condensation of 2,6 xylenol using a process claimed by the Applicant (Italian Patent Application No. 24024/83). The samples of homopolymer and its blends are characterized by measurements of:

Intrinsic Viscosity [η]

This property is determined in a chloroform solution at 25° C. using an Ubbelohde viscometer and is expressed in dl/g.

Melt Flow Index (MFI)

The estimation of the flow index is carried out in a melt indexer with the loads specified in the tables and a temperature range of 280°÷300° C. according to ASTM D 1238.

Weight Average Molecular Weight ($\overline{MW}$)

This measurement is carried out by means of the gel permeation chromatography of polymer solutions in tetrahydrofuran (conc. 0.1%), at a temperature of 25° C.

The polymeric compositions referred to in the following examples are prepared with a styrene-butadiene polymer characterized by its high impact strength (Edistir SRL640-Montedipe) having a flow index of 2.9 g/10 min, measured at 200° C. with a load of 5 Kg.

These blends are prepared by extruding the components fed in the pre-established ratios through a single-screw extruder with a screw diameter of 20 mm and a L/D=20 at a temperature of 280° C. and a screw speed of 50 revs/min.

The experimental examples which follow provide a clearer illustration of the present invention but do not restrict it in any way.

EXAMPLE 1

A sample of polyphenylene oxide with [η]=0.54 dl/g is dissolved in a mixture of toluene-chloroform (75/25 by volume). Dibenzoylmethane is added to the solution in such quantities as to reach 1.5 phr with respect to the polymer. The solvent is then removed at reduced pressure, the solid is crushed in a rotating blades mill and the powder obtained is dried to constant weight in a vacuum oven heated to 65°÷70° C.

It is then loaded into a melt flow indexer heated to 320° C. The gage of the instrument is loaded with an adequate weight to allow the extrusion of the polymeric mass. The material is collected at different times and the $\overline{MW}$ and flow index are measured.

As a comparison, a polymer sample without the additive, is treated in the same way. Table 1 shows the results.

TABLE 1

| Residence time at 320° C. min. | MFI at 320° C. | | MW | g/moles |
|---|---|---|---|---|
| | (1) g/10' 2.16 Kg | (2) g/10' 12 Kg | (1) | (2) |
| 0 | — | — | 43,800 | 43,800 |
| 7 | 2 | 1.8 | 54,400 | 82,600 |
| 9 | 1.3 | 1.8 | 60,200 | 88,950 |
| 11 | 1.2 | 1.6 | 60,900 | 95,100 |
| 14 | *2.3 | 1.2 | 63,600 | 102,200 |

*MFI value was determined with a load of 5 Kg.
(1) sample with dibenzoylmethane
(2) sample without dibenzoylmethane As can be seen from Table 1, the addition of the additive considerably limits the increase of $\overline{MW}$ due to the temperature effect.

EXAMPLE 2

Another sample of polyphenylene oxide having a different molecular weight ([η]=0.42) dl/g) is treated in the same way as described in the previous example.

Also in this case, the addition of dibenzoylmethane considerably reduces the branching process of the polymer (see Table 2).

TABLE 2

| Residence time at 320° C. min. | MW in g/moles | |
|---|---|---|
| | Samples with dibenzoylmethane | Samples without dibenzoylmethane |
| 0 | 28,000 | 28,000 |
| 7 | 39,000 | 62,000 |
| 9 | 40,500 | 65,000 |
| 11 | 41,000 | 70,000 |
| 13 | 41,000 | 68,700 |
| 16 | 44,000 | 68,000 |

EXAMPLE 3

45 parts by weight of polyphenylene oxide with [η]=0.56 dl/g are thoroughly mixed with 55 parts of styrenic polymer Edistir SRL 640. 1.5 parts of carbon black X-E2, 1.5 parts of an ester of phosphorous acid and 1.5 parts of dibenzoylmethane are added.

The mixture is treated in a single-screw extruder at a temperature of 280° C. and the extruded material cooled in water and collected.

The extrusion is repeated several times consecutively to determine the variations in the viscosity of the molten material with relation to the number of extrusions, or to the number of thermal treatments to which the material is submitted.

As a comparison, another mixture composed of the same ingredients but without the diketonic additive is treated in the same way. The results are shown in Table 3.

TABLE 3

| Number of extrusions | MFI (280° C.) g/10 min. with 5 Kg | |
|---|---|---|
| | Comparison | Sample |
| 1 | 2.9 | 6.3 |
| 3 | 2.9 | 6.7 |
| 5 | 3.4 | 7.1 |
| 7 | 3.7 | 7.5 |

From the above, it can be seen that the addition of dibenzoylmethane to the blend gives much more fluidity to the molten material. This effect is particularly evident in Table 4 which shows the viscosity values of the molten material at different shear rates for the blend with and without the additive.

TABLE 4

| Shear rate | Viscosity of the molten material at 280° C. - Pa sec | |
|---|---|---|
| sec$^{-1}$ | Sample | Comparison |
| 48 | 742 | 1.484 |
| 96 | 631 | 1.187 |
| 192 | 519 | 872 |
| 480 | 341 | 497 |
| 960 | 234 | 323 |
| 1920 | 158 | 202 |

EXAMPLE 4

45 parts of polyphenylene oxide with $[\eta]=0.54$ dl/g are mixed with 55 parts of Edistir SRL 640; 0.2 parts of a sterically hindered phenol and 0.4 parts of an ester of phosphorous acid are added to the mixture. 1.5 parts of dibenzoyl methane are then added to the resulting mixture and the material is extruded in a single-screw extruder.

The extruded material is cooled in water and cut into granules which, after being dried, are submitted to a thermal stability test in a melt flow indexer. This consists of calculating the fluidity index at 300° C., with a load of 5 Kg. Table 5 shows the results.

EXAMPLE 5

Using the same procedure as in the previous example, 1.5 parts of 1,5-diphenyl-1,3,5-pentanetrione are added to the mixture as a thermal stabilizing additive. The results are shown in Table 5 and by comparing these with the results of the control test (in which no additive is added to the mixture), it is possible to deduce the effectiveness of compounds containing methylenic groups with active hydrogens on the stabilization of blends of polyphenylene oxide, which results in a fluidification of the molten mass.

TABLE 5

| Residence time in minutes | 0 | 10 | 20 | 30 |
|---|---|---|---|---|
| Type of additive | MFI at 300° C. - 5 Kg g/10 min | | | |
| dibenzoylmethane | 19.4 | 20.6 | 20.6 | 20.8 |
| 1,5-diphenyl-1,3,5 pentanetrione | 16.6 | 16.5 | 16.9 | 16.9 |
| comparison without additive | 7.9 | 8.7 | 9.5 | 10.4 |

EXAMPLES 6-8

45 parts of polyphenylene oxide with $[\eta]=0.56$ dl/g, 55 parts of Edistir SRL 640, 1.5 parts of an ester of phosphorous acid, 1.5 parts of carbon black X-E2 are mixed with 1.5 parts of the compounds indicated in Table 7, as stabilizing additives. The mixtures are extruded in a single-screw extruder. The extruded material is cooled with water and cut into granules, which, after drying, are submitted to the thermal stability test in a melt flow indexer at 300° C. with an applied load of 5 Kg.

At the same time a mixture without the stabilizing additive is extruded and analyzed as a comparison.

The results shown in Table 7, confirm the effectiveness of the methylenic compounds with active hydrogens even when they are part of a cycloaliphatic ring.

TABLE 6

| Residence time in minutes | 0 | 10 | 20 | 30 |
|---|---|---|---|---|
| Example | Type of additive | MFI 300° C. - 5 Kg g/10′ | | |
| 6 | 1-phenyl-1,3-butane-dione | 16 | 16.6 | 16.4 | 18.7 |
| 7 | 5,5-dimethyl-1,3-cyclohexanedione | 17 | 18.6 | 19.3 | 21.1 |
| 8 | 2-methyl-1,3-cyclopentanedione | 15.4 | 16.7 | 15.5 | 15.9 |
| | comparison without additive | 6.8 | 6.6 | 6.2 | 6.5 |

We claim:

1. Polymeric compositions based on at least one polyphenylene ether (PPE) obtained from the (co)polymerization by oxidative coupling of one or more substituted phenols, either alone or together with at least one (co)polymer of styrene, characterized by the fact that they contain a stabilizing additive in a stabilizing amount of at least one compound having at least one ketone selected from the group consisting of the following structural formulae:

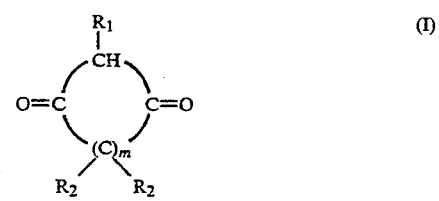

(I)

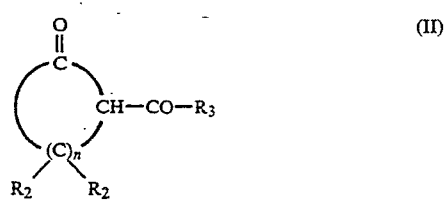

(II)

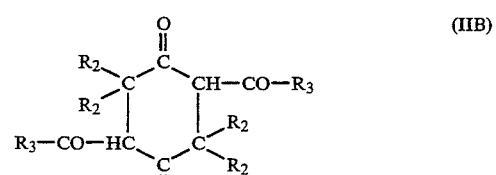

(IIB)

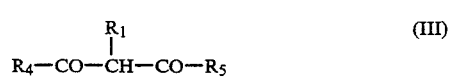

(III)

where m is an integer ranging from 2 to 5, and n is an integer ranging from 3 to 6, $R_1$ and $R_2$, which can be independently either the same or different, are selected from the group consisting of hydrogen, alkyl, cycloalkyl, arylalkyl, aryl, haloalkyl, acyl radical, a chlorine atom, a bromine atom and a —$(CH_2)_x$—$COOR_6$ radical where x is an integer ranging from 1 to 5, and $R_6$ is selected from the group consisting of hydrogen, alkyl, cycloalkyl, arylalkyl, aryl, alkylaryl, haloalkyl, haloaryl and haloarylalkyl, $R_4$ and $R_5$, which can be independently either the same or different, are selected from the group consisting of:

cycloalkyl, arylalkyl, haloalkyl;
aryl, alkylaryl, haloaryl, haloalkylaryl;
$OR_7$, $CH_2R_7$, $CH_2$—$COR_7$ and $CH_2$—$COOR_7$ wherein $R_7$ independently is selected from the group consisting of hydrogen, alkyl, cycloalkyl, arylalkyl, haloalkyl, aryl, alkylaryl, haloaryl and haloalkylaryl and R$_3$ is selected from the group consisting of hydrogen alkyl, cycloalkyl, arylalkyl, haloalkyl;

aryl, alkylaryl, haloaryl, haloalkylaryl;

OR$_7$, CH$_2$R$_7$, CH$_2$—COR$_7$ and CH$_2$—COOR$_7$ wherein R$_7$ independently is selected from the group consisting of hydrogen, alkyl, cycloalkyl, arylalkyl, haloalkyl, aryl, alkylaryl, haloaryl and haloalkylaryl.

2. Polymeric compositions according to claim 1 characterized by the fact that the radical —R$_1$ of formulae (I) and (III) represents a hydrogen atom and radical —R$_3$ of formulae (II) and (IIB) stand for an —OR$_7$ alkoxylic radical wherein each R$_7$ can independently have the above specified meaning.

3. Polymeric compositions according to claim 1 where the polyphenylene ether corresponds to one of the following general formulae:

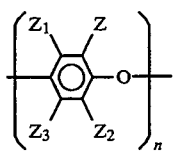

IV

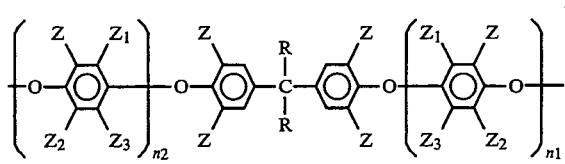

V

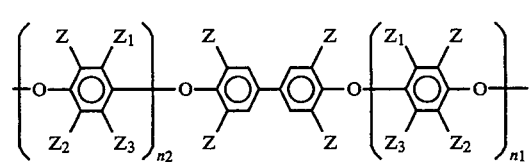

VI where Z$_1$, Z$_1$, Z$_2$, Z$_3$ are monovalent substituents independently selected from the group consisting of hydrogen, chlorine, bromine, fluorine, alkyl radical, substituted alkyl radical, cycloalkyl radical, substituted cycloalkyl radical, phenyl and substituted phenyl radical; R is selected from the group consisting of hydrogen and an alkyl radical; n$_1$ and n$_2$ are integers whose sum is higher than 50, and n is an integer higher than 50.

4. Polymeric compositions according to any one of claims 1, 2 and 3, characterized by the fact that the PPE is poly(2,6-dimethyl-1,4-phenylene ether) and/or its copolymers with one or more alkylphenols corresponding to the general formula (IV)

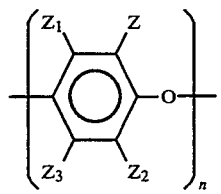

IV where Z, Z$_1$, Z$_2$, Z$_3$ are monovalent substituents independently selected from the group consisting of hydrogen, chlorine, bromine, fluorine, alkyl radical, substituted alkyl radical, cycloalkyl radical, substituted cycloalkyl radical, phenyl and substituted phenyl radical; and n is an integer higher than 50.

5. Polymeric compositions according to claim 4, where the polyphenylene ether is poly(2,6-dimethyl-1,4-phenylene ether) and/or its copolymers obtained from 2,6-dimethylphenol with 2,3,6-trimethylphenol.

6. Polymeric compositions according to any one of claims 1, 2 and 3, where the polyphenylene oxide has an intrinsic viscosity ranging from 0.3 to 0.7 dl/g measured in a chloroform solution at 25° C.

7. Polymeric compositions according to any one of claims 1, 2 and 3, where the polyphenylene ether ranges from 1 to 99% by weight.

8. Compositions according to claim 7, where the polyphenylene oxide contained in the mixtures ranges from 20 to 80% by weight.

9. Compositions according to any one of claims 1, 2 and 3, characterized by the fact that the (co)polymer of styrene is a polymer, copolymer, interpolymer, random or block, linear or branched or graft, (co)polymer containing styrenic units.

10. Compositions, according to claim 9, characterized by the fact that the (co)polymer of styrene is selected from the group consisting of polystyrene (PS), high impact polystyrene (HIPS), polystyrene grafted on any polymeric, plastic or thermoplastic sublayer, ABS resins, SBR rubbers, linear or star copolymers based on polystyrene or grafted with polystyrene or various copolymers or interpolymers of styrene with different monomers.

11. Polymeric compositions according to claim 10 where the content of the (co)polymer of styrene ranges from 0.95 to 80% by weight.

12. Compositions according to any one of claims 1, 2 and 3, where the stabilizing additive is dibenzoylmethane.

13. Composition according to any one of claims 1, 2 and 3, where the stabilizing additive is 1,5-diphenyl-1,3,5-pentanetrione.

14. Composition according to any one of claims 1, 2 and 3, where the stabilizing additive is phenyl stearoyl-benzoylmethane.

15. Composition according to any one of claims 1, 2 and 3, where the stabilizing additive is 1-phenyl-1,3-butanedione.

16. Composition according to any one of claims 1, 2 and 3, where the stabilizing additive is 5,5-dimethyl-1,3-cyclohexanedione.

17. Composition according to any one of claims 1, 2 and 3, where the stabilizing additive is 2-methyl-1,3-cyclopentanedione.

18. Composition according to any one of claims 1, 2 and 3, where the stabilizing additives are used in quantities of 0.05÷4 parts by weight for every 100 parts by weight of polyphenylene oxide and/or its blends.

19. Moulded products from a composition as defined in any one of claims 1 to 3.

20. Composition according to claim 10, where the (co)polymer of styrene is a styrene-maleic anhydride, styrene-maleic imide, styrene-acrylic acid, styrene-(meth)acrylate, acrylonitrile-styrene-acrylate or methacrylate-acrylonitrile-butadiene-styrene copolymer.

* * * * *